May 23, 1967  E. A. LEWCZYK  3,321,575
TELEVISION INSPECTION APPARATUS ADAPTED FOR MEASUREMENT
AND COMPARISON PURPOSES
Filed Feb. 11, 1964
5 Sheets-Sheet 1
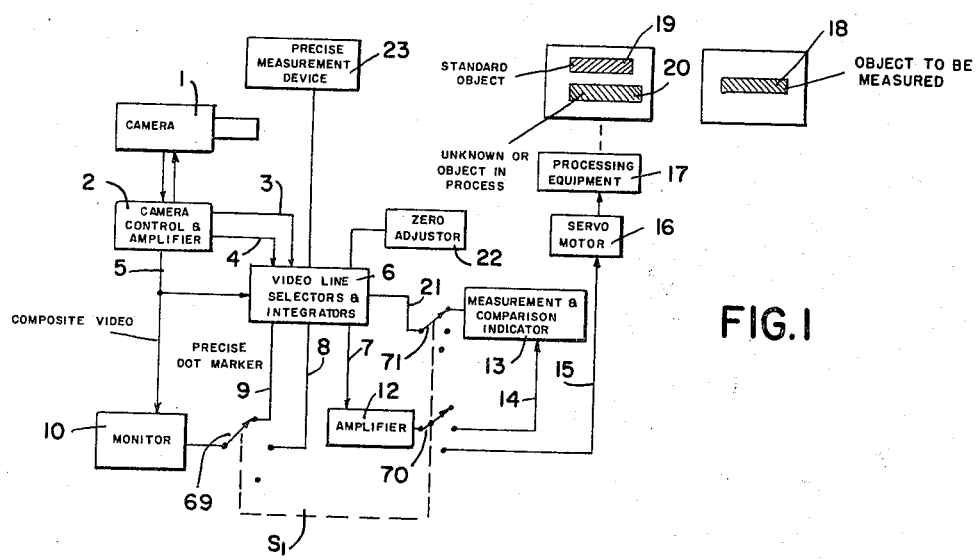
FIG.1
FIG.7
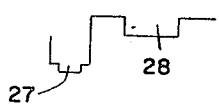
FIG.9
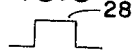
FIG.11
FIG.13
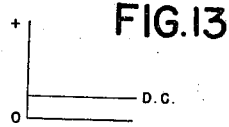
FIG.8
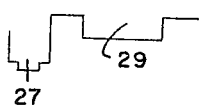
FIG.10
FIG.12
FIG.14
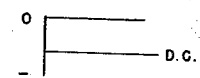
INVENTOR.
EDWARD A. LEWCZYK
BY
Raymond W Cooltan
ATTORNEY May 23, 1967  E. A. LEWCZYK  3,321,575
TELEVISION INSPECTION APPARATUS ADAPTED FOR MEASUREMENT
AND COMPARISON PURPOSES
Filed Feb. 11, 1964  5 Sheets-Sheet 2
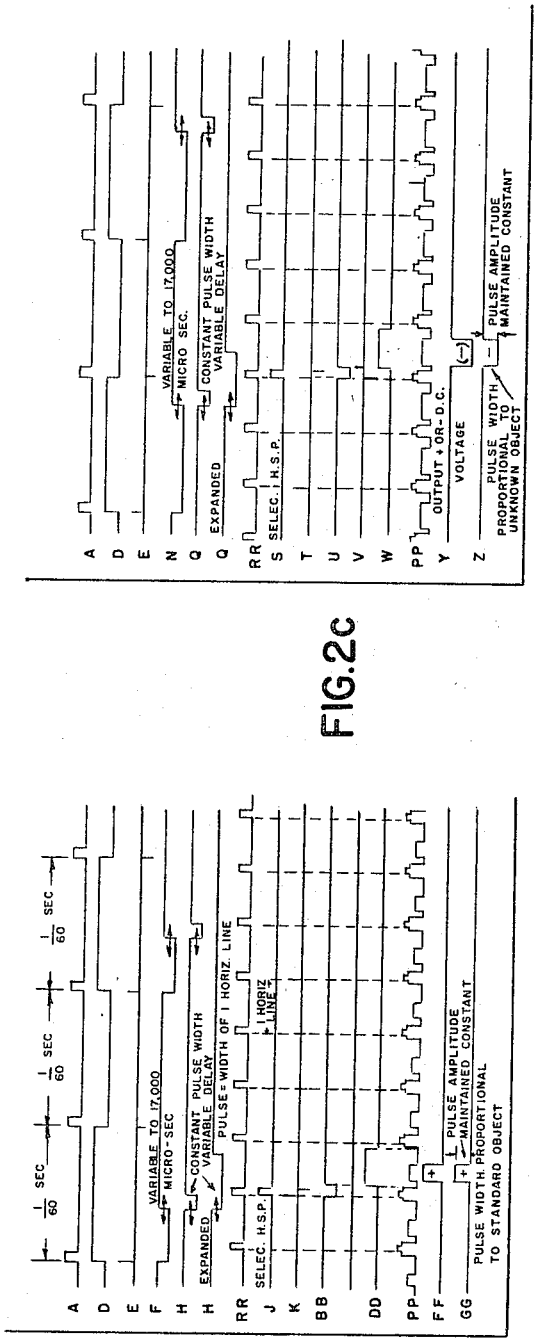
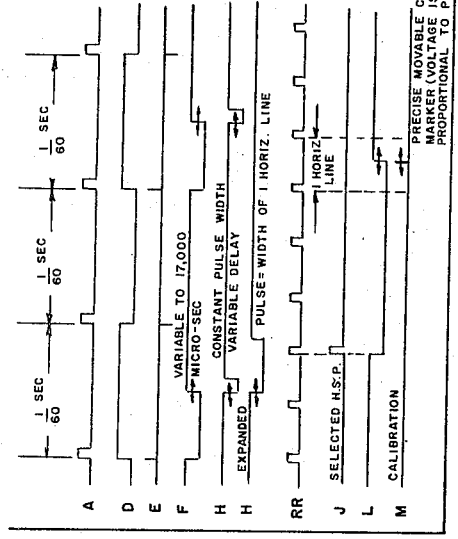
INVENTOR.
EDWARD A. LEWCZYK
BY
*Raymond Walton*
ATTORNEY

INVENTOR.
EDWARD A. LEWCZYK
BY
ATTORNEY

United States Patent Office 3,321,575
Patented May 23, 1967

3,321,575
TELEVISION INSPECTION APPARATUS
ADAPTED FOR MEASUREMENT AND
COMPARISON PURPOSES
Edward A. Lewczyk, Newington, Conn., assignor to Jolew
Corporation, Newington, Conn., a corporation of
Connecticut
Filed Feb. 11, 1964, Ser. No. 343,989
9 Claims. (Cl. 178—6)

The present invention relates to the exact measurement of an object without physical contact and also to the comparison of a standard object to an unknown object. It contemplates obtaining a difference signal from a standard and an unknown object, which signal can be calibrated, or it can be introduced to a servo system which can operate a controlling device to conform the unknown object to the standard object.

It is often improtant to obtain a dimension of an object that cannot be measured readily and accurately by known means, a problem frequently encountered when it is necessary to ascertain the distance between two parts in a completed assembly, such as a completed timing mechanism. Conventional equipment, such as optical comparators have many known limitations for such uses and the use of microscopes is impractical. The present invention permits excellent detail to be achieved and permits measurements to be made without physical contact.

In accordance with the present invention the object undergoing study can be observed visually by electro-optical means wherein the combined electronic and optical magnification are known, and then, by superimposing a calibrated electronic marker of variable length on the television monitor screen, it is possible to measure a distance without physical contact of the part or distance being measured.

It is also contemplated by the present invention to provide a video signal from a standard object and compare this video signal with another video signal dependent on a similar dimension of an object under inspection. The difference signal resulting from such a comparison of the two video signals can be converted to an equivalent dimensional difference.

The present invention also contemplates the provision of a video responsive servo system which will operate, directly or indirectly, a controlling mechanism which will make an unknown object equal to a standard object.

In practicing the invention, the objects to be measured, such as a completed timing mechanism, are placed in a holding fixture in such fashion that the dimension to be measured is visible to a television or other type of video camera and where preferred, two cameras and a split screen can be used. A standard calibrated gage block is also positioned so as to be visible and to indicate the total optical-electronic magnification of the timing mechanism. If desired, the standard can be adjusted to a definite magnification, under which circumstances the measurement indicator serves as a dimensional direct reading device.

A repetitive straight line signal representing a line passing through the dimension to be measured, is selected from every complete frame of the composite video signal. Such repetitive straight line signal is made variable, and the end of this selected variable straight line will appear on the television monitor display as a movable dot. The dot is moved to coincide with the beginning of the object to be measured and then a zeroing control is manually set to zero. The dot is then moved to the end of the object undergoing measurement and the output meter is read. If the system had not been previously set for direct reading, knowledge of the overall magnification will allow easy conversion to permit the actual physical dimension to be read directly.

In conjunction with an automatic inspection process it may be desired to compare production unit dimensions with those of a standard part. In such cases, a television or other type of video camera will be used to observe the standard part and the production unit to be compared. A repetitive straight line signal represented by a line passing through the standard object is selected from every complete frame on the composite video signal and a direct current signal representing the width of the standard object is derived. Another straight line signal is also passed through the unknown object, such as the production unit, and is selected from every complete frame of the composite video information and a direct current signal representing the width of the unknown object is also derived. These direct current signals are suitably compared to produce a difference signal which is supplied to an indicator which registers the variation existing between the two objects. This difference signal can also be used, for example, to operate a suitable direct current servo motor system which can control a suitable device, such as a machine tool, to process the unknown part until its desired dimension conforms to that of the standard part.

Another feature of the present invention is the provision of a television monitor screen which may be connected to the composite video output of the video camera to visually display the standard object and the unknown object. Also, in accordance with the invention, when using a monitor the line selecting means may also be connected to the monitor to emphasize in brightness or darkness the particular horizontal lines being selected for use in deriving the comparison signals.

The measurement system of the invention has many advantages in addition to those already mentioned as will be apparent from the following specification and drawings. It is desirable to point out that when using the monitor, the information depicted on the screen will reveal more to the viewer than would a magnifying glass held in the hands of the viewer, since the video camera and monitor arrangement permits a high degree of magnification and the magnified image on such a display screen can be viewed by more than one person at a time. It should be emphasized that a plurality of such monitors can be used simultaneously at a corresponding number of locations to check the operation of such systems. The system therefore permits precise gaging without physical contact and can be used in conjunction with measurements at locations where access is difficult or hazards are great. The present invention lends itself admirably for use in processing unsafe materials while the operator is at a remote location from which he can observe operations on a television monitor while controlling the process by means of servo or other remote manual control devices.

The invention is also useful to locate or position one or more objects relative to another object or objects. For example in the field of micro-electronics, by virtue of this invention, the manipulation and registration for assembly of elementary components can be achieved on a production basis.

The present invention readily adapts itself to the storing of intelligence on video tape, by any of the methods currently employed. This will enable the user to reconstruct the history of various operations and to store this information in a relatively small space.

A more complete understanding of the invention will follow from a description based upon the accompanying drawings wherein:

FIG. 1 is a block diagram illustrating the invention;
FIG. 2a depicts the waveform logic for a precise physical measurement system;

FIGS. 2b and 2c depict the waveform logic for a comparator-servo system;

FIG. 5 is a diagram relating to a system for precise measurement;

FIG. 6 is a diagram relating to a system for the comparator or servo systems;

FIGS. 7 and 8 are graphic representations of the selected horizontal lines used in FIG. 6;

FIGS. 9 and 10 are graphic representations of the characters of FIGS. 7 and 8 with the synchronization pulses removed and the remaining signal inverted;

FIGS. 11 and 12 are graphic representations of actual measurement signals associated with FIG. 6; and FIGS. 13 and 14 are graphic representations of the actual D.C. signals derived from the signals of FIG. 11 and 12 respectively.

Referring to FIG. 1 of the drawings, a selector switch S1 having movable contacts 69, 70 and 71, is operated to condition the system for precise measurement when in the illustrated position engaging the uppermost fixed contacts. This is referred to as Mode I. When the movable contacts engage the intermediate fixed contacts, the standard and unknown object are adapted to be compared, providing a condition identified as Mode II. When the movable contacts engage the lowermost fixed contacts, the unknown object can be processed by means of suitable servo and processing equipment.

Figure 4A:
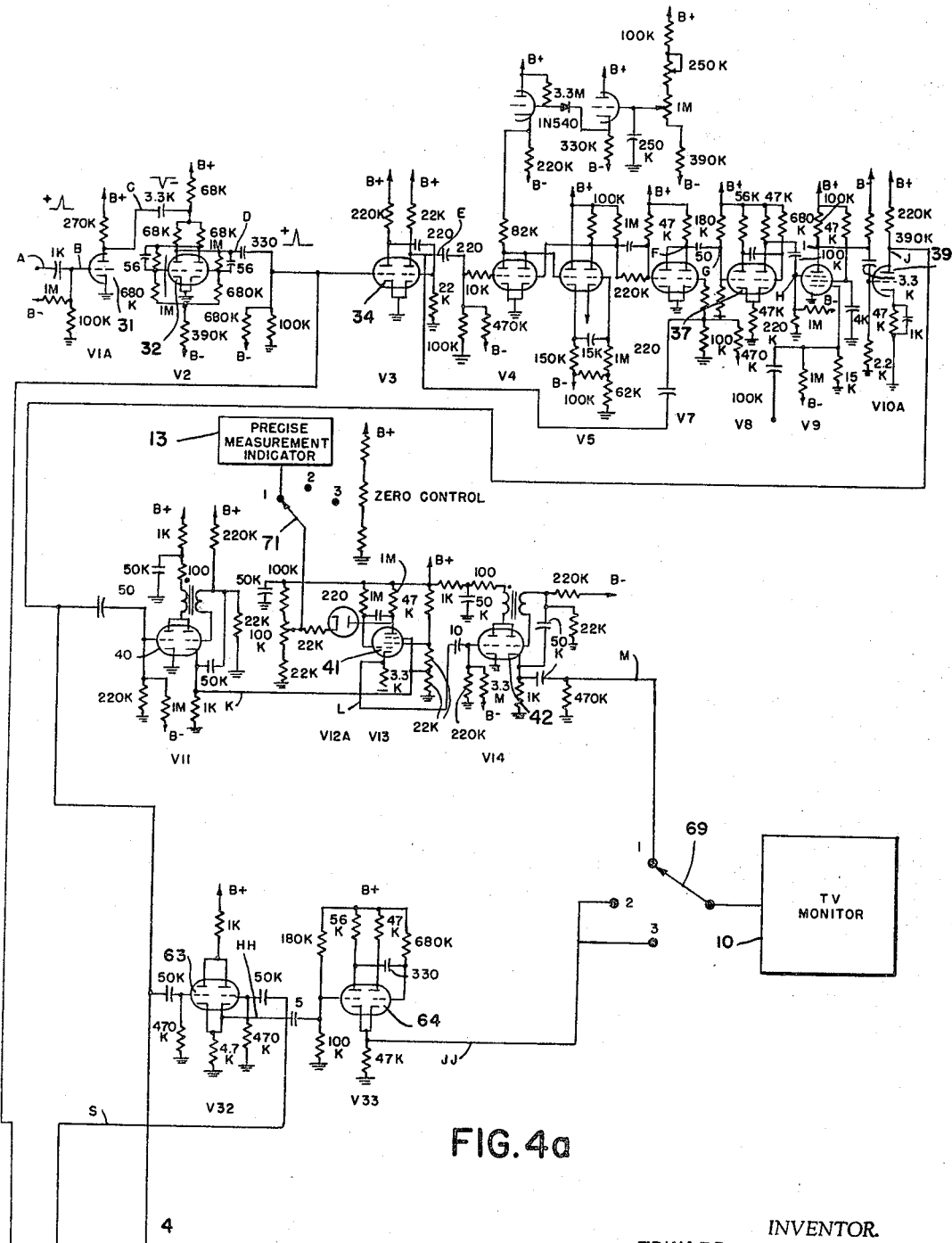
FIGS. 4a and 4b depict a circuit diagram exemplifying the invention.
Figure 4B:
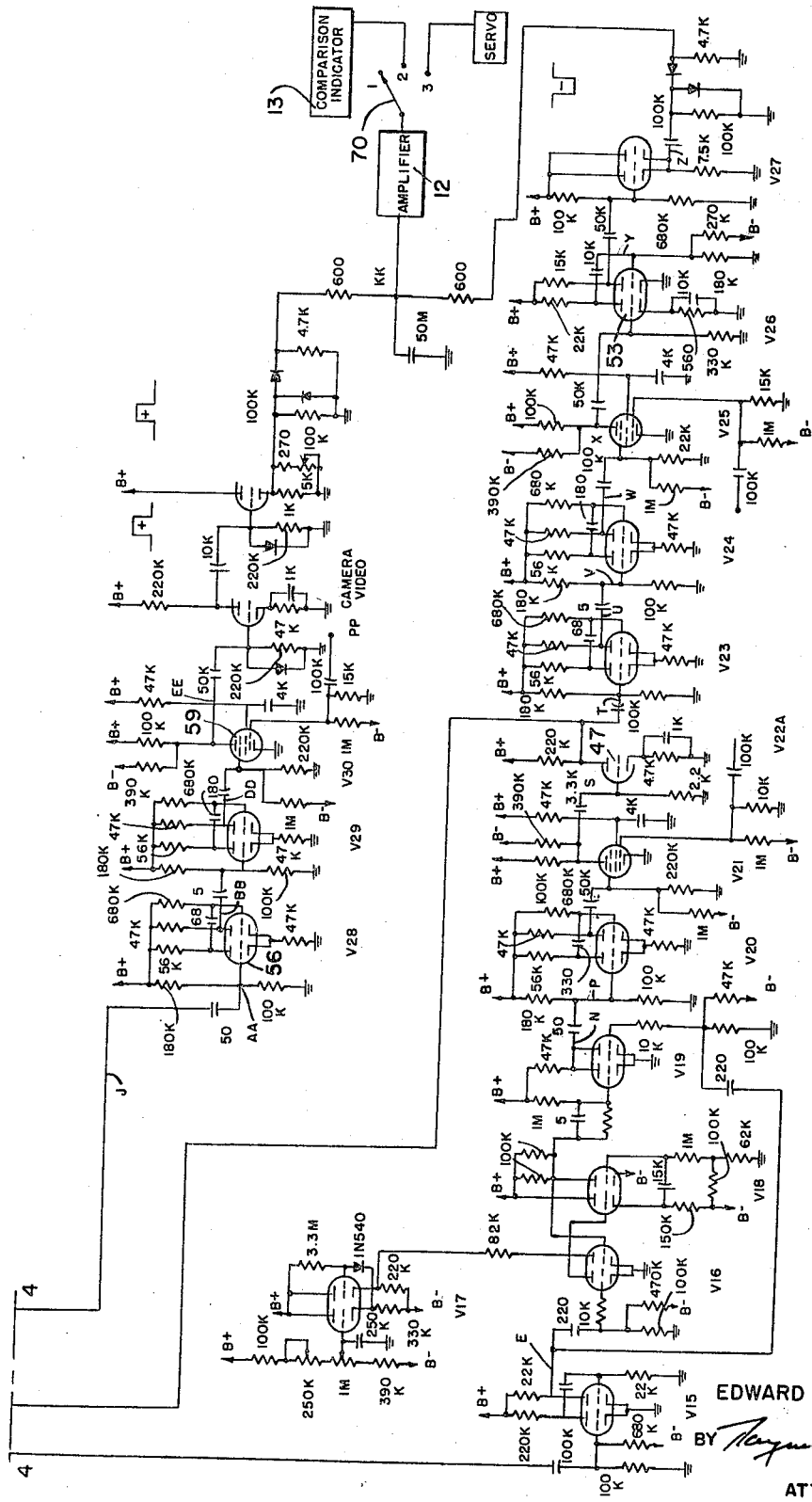

With the switch S1 in the precise measurement position, known as Mode I, a gage block of known dimensions is initially inserted into the camera field for the purpose of establishing a calibration. Then an unknown object 18 is inserted in place of the known object for the purpose of measurement. To accomplish this, the composite video signal output from a television camera 1 is connected to conventional camera control and amplifying circuits 2 which normally provide the vertical and horizontal synchronization signals for the camera as well as the amplified video output signal from the camera. A monitor display 10 is connected to one of the composite video signal outputs of the camera control 2 by means of a conductor 5. Another composite video output signal from the camera control 2 is connected to a video line selector and integrator circuit 6. The specific arrangement of the video line selector and integrator is shown in FIG. 4 of the drawings and will be later described in detail. Vertical and horizontal signals are obtained from the camera control 2, and by means of conductors 3 and 4 respectively, are connected to the video line selector and integrators 6. The video line selector and integrator 6 derives from the signals supplied by the conductors 3, 4 and 5, a signal representing the scanning of a single horizontal line by the video camera 1, which may be adjusted to select a horizontal line passing along or through the object or specimen 18 to be measured. This selected horizontal line is shown by the dotted line 24 in the diagram of FIG. 5. The length of this selected variable pulse is visible as a movable dot 25 on the screen of the monitor 10. The movable dot 25 is first positioned at the leading edge of the left side of the standard object to be measured. Then the zero adjuster 22 of FIG. 1 is adjusted to bring the measurement indicator 13 to the zero reference setting. The precise measurement control 23 is then rotated until the movable dot 25 is in coincidence with the right side of the standard object employed for calibration. The reading which then appears on the measurement indicator 13 is the reference point. The standard object is then removed and the specimen or unknown object 18 to be measured is inserted into the camera field. The procedure followed with the standard object is repeated and the reading which appears on the measurement indicator 13 will be in the same direct proportion to the reading obtained with the standard object as are the respective actual linear dimensions. The system can be adjusted so that the indicator 13 will read in actual dimensions or multiples thereof by setting the magnification factor to a predetermined value, in which case, the scale on the measurement indicator 13 will provide a direct reading.

The operation of the equipment when the movable contacts of the selector switch S1 engage their intermediate fixed contacts, Mode II, permits the comparison of an unknown object with a standard or known object. Referring to FIG. 1, the video camera 1 is shown as assuming a position in which it can simultaneously view a standard 19 and an unknown object 20. The composite video signal output from the camera 1 is connected, as in the previous case, to conventional camera control and video amplifying circuits 2 which normally provide the vertical and horizontal synchronization signals for the camera and also receive the amplified video output signal from the video camera. A monitor display 10 is connected to one of the composite video signal outputs of the camera control 2 by means of the conductor 5. Another composite video output signal from the camera control 2 is connected to the video line selector and integrator circuit 6. In this case, the video line selector and integrator 6 derives from the signals supplied by the conductors 3, 4 and 5, a signal representing the scanning of a single horizontal line by the video camera 1, which may be adjusted to select horizontal lines passing through the objects 19 and 20 being compared. Referring to FIG. 6, a single horizontal line 26a is selcted from each complete frame of the composite video information which passes through the standard object 19, and a different single horizontal line 26b passing through the unknown object 20 is selected from each complete frame of composite video. These two selected horizontal lines 26a and 26b are visible on the monitor 10. The integrator portion of the video line selector and integrator 6 derives from the signal representing the selected horizontal line 26a of the standard object 19, a first direct current signal proportional in amplitude to the width of the standard object. A second direct current signal is derived from the selected horizontal line 26b shown passing through the unknown object 20, and this signal is proportional in amplitude to the width of the unknown object. In accordance with the invention, one of these direct current signals may be reversed in polarity and compared with the other direct current signal to produce a difference signal. The difference signal will be supplied by a conductor 7 to an amplifier 12, which amplifier may be a direct current type, chopper, or any other type that will amplify such a difference signal. The amplified difference signal is supplied by a conductor 14 to a measurement and comparison indicator 13 which provides an indication of the proportional difference in the sensed physical dimension between the standard and unknown object. This indication can be adjusted to provide a direct reading of dimensional differences if the magnification factor is appropriately selected. When the movable contacts of the switch S1 engage the lowermost fixed contacts, the system assumes a Mode III condition which is similar to Mode II except that the resulting difference signal will cause modification of the unknown object 20 to cause it to assume the same physical dimension as that of the standard object 19. The difference signal supplied by conductor 7 is amplified in the amplifier 12 and this amplified difference signal will be fed by a conductor 15 to a servo motor which effects operation of processing equipment 17, such as a machine tool, until the difference signal is reduced to zero. This difference signal will assume a zero value when the camera 1 viewing both the standard object 19 and the object 20 to be processed obtains a direct current signal from the unknown object 20 in the integrator section of the video line selector and integrator 6 having the same amplitude as that of the direct current signal received from the standard object 19. When the difference signal becomes zero, the servo motor 16 and the processing equipment 17 will no longer function, signifying that the dimension of the unknown object has become equal to that of the standard object.

In FIGS. 7 through 14 of the drawings, the voltage waveforms of the various signals previously mentioned are shown. FIG. 7 shows the voltage waveform of a complete scanned horizontal line as selected by the video line selector 6 passing through the standard object 19. This waveform includes the synchronization signal portion 27 and a voltage peak 28 representing the size of the standard object.

FIG. 8 shows the voltage waveform of a completely scanned horizontal line selected by the video line selector 6 passing through the unknown object 20. This waveform includes the synchronization signal portion 27, and a voltage peak 29 representing the size of the unknown object.

FIG. 9 depicts the voltage waveform resulting from the signal of FIG. 7 after it has been gated to select the portion 28 of the selected horizontal line representing the physical dimension of the standard object. FIG. 10 depicts the waveform of the voltage 29 after it has been modified by suitable gating circuits, to be described, for selecting a single horizontal line signal of FIG. 8 and representing the physical dimension of the unknown object.

FIG. 11 depicts the waveform of the signal shown in FIG. 9 after amplification and FIG. 12 depicts the waveform of the signal of FIG. 10 after amplification and also after reversal of its polarity. The height of the signal shown in FIG. 11 is the same as that of the signal shown in FIG. 12.

FIG. 13 depicts the amplitude of the direct current signal of positive polarity produced by the integration of the duration of signal 28 of FIG. 11. The amplitude of the direct current signal of FIG. 13 is proportional to the width or duration of the pulse 28 and therefore is proportional to the size of the standard object. FIG. 14 shows the amplitude of the direct current signal of negative polarity which is correspondingly proportional to the width and duration of the pulse 29 after it has been integrated, and this signal is proportional in amplitude to the size of the unknown object. It will be apparent upon comparing the amplitudes of the two direct current signals of FIGS. 11 and 12, that a difference signal will be obtained which is indicative of the difference of the physical dimensions of the standard and unknown objects, and this difference signal may be utilized to deflect a readout indicator or it may be employed as a servo signal to energize the servo motor 16 as previously described.

As shown in FIGS. 7 and 8, the selected horizontal line signals include the horizontal synchronization pulse 27 at the start of the scanning of the selected horizontal lines. These selected horizontal synchronization pulses 27 may be supplied by the conductor 8 to the monitor 10, after suitable circuit alterations, and may cause the display of the monitor to be enhanced during the display of the selected horizontal lines.

Figure 3:
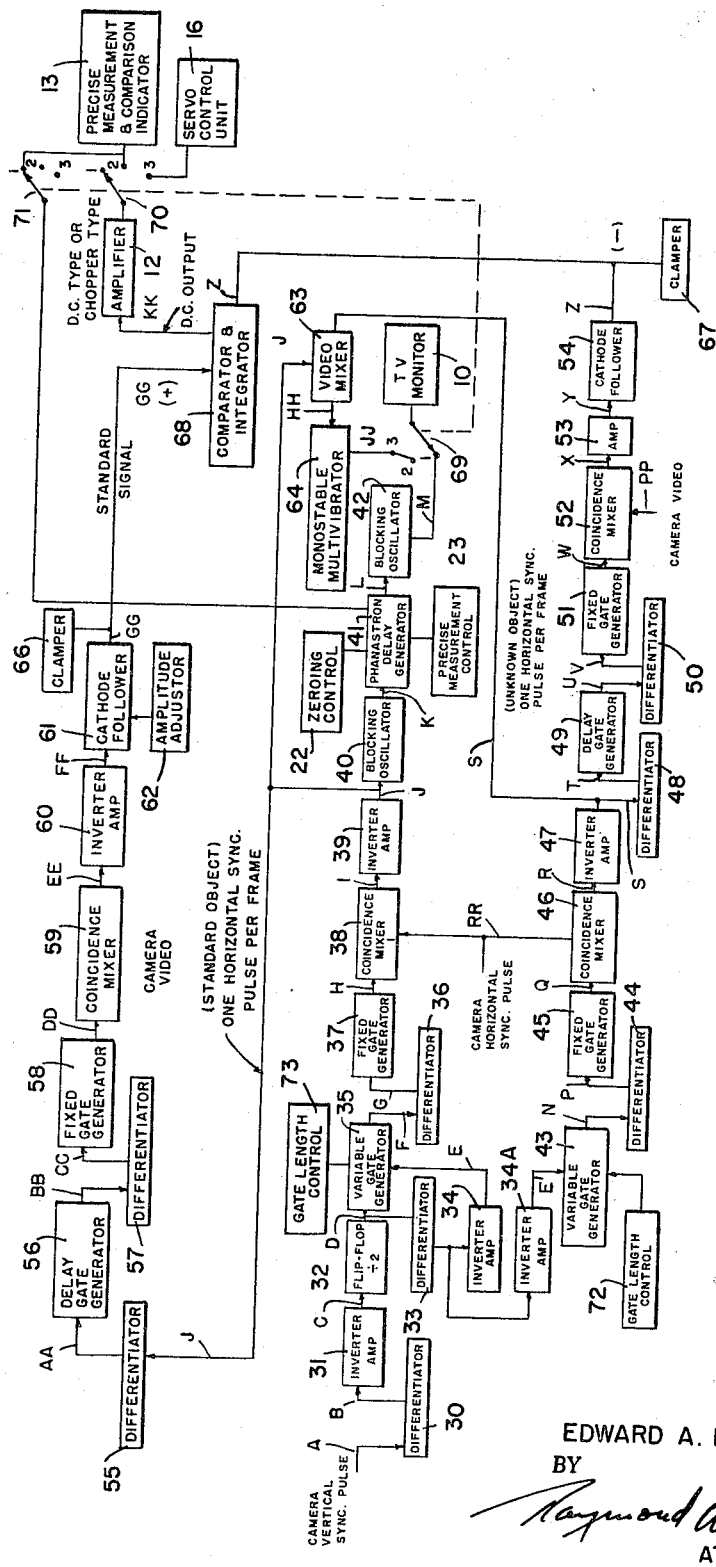
FIG. 3 is a complete system block diagram wherein the letters correspond to those identifying the waveforms in FIGS. 2a, 2b and 2c.

Referring now to FIGS. 3 and 4 of the drawings, a somewhat more detailed description of the invention will follow. As shown by the block diagram of FIG. 3, the system includes a differentiator 30, an inverter amplifier 31, a bi-stable flip-flop circuit 32, a differentiator 33, inverter amplifiers 34 and 34A, a variable gate generator 35, a differentiator 36, a fixed gate generator 37, a coincidence mixer 38, an inverter amplifier 39, a blocking oscillator 40, a phantastron delay generator 41, a blocking oscillator 42, a variable gate generator 43, a gate length control 72, a differentiator 44, a fixed gate generator 45, a coincidence mixer 46, an inverter amplifier 47, a differentiator 48, a delay gate generator 49, a differentiator 50, a fixed gate generator 51, a coincidence mixer 52, an amplifier 53, a cathode follower 54, a differentiator 55, a delay gate generator 56, a differentiator 57, a fixed gate generator 58, a coincidence mixer 59, an inverter amplifier 60, cathode follower 61, an amplitude adjustor 62, a video mixer 63, a monostable multivibrator 64, a precise measurement control 23, a clamper 66, a clamper 67, an integrator and comparator 68, an amplifier 12, a precise measurement and comparator indicator 13, and selector switches 69, 70 and 71 which are ganged together.

The operation of the system when the selector switch is in the position depicted in FIG. 3 for precise measurement, Mode I, is as follows, bearing in mind that the letters shown in the diagrams of FIGS. 3 and 4 indicate the similarly designated waveforms respectively, appearing in FIG. 2.

A vertical synchronization signal from the camera control 2, shown in FIG. 1, is applied to the input terminal A of FIG. 3. The waveform A is differentiated by differentiator circuit 30 producing a pulse B which provides a positive leading edge pulse for triggering the grid electrode of the inverter amplifier 31. The resulting negative pulse C at the plate of the tube of the inverter amplifier 31 triggers the bi-stable flip-flop 32. Thus, a half square wave cycle D is produced by each vertical synchronization pulse from the inverter amplifier 31. This square wave D is differentiated at the control grid of the inverter amplifier 34. The single positive pulse resulting from two successive vertical synchronization pulses is then used to trigger a variable pulse width monostable multivibrator 35, the gate length control 73 establishing the length of the pulse required.

The waveform F of the gate length pulse can be observed at the input to the differentiator 36. The circuit constants of the differentiator 36 differentiate the variable gate length waveform into two voltage peaks including a negative pulse and a positive pulse G which is variable in time with respect to the negative pulse. The positive pulse G triggers the monostable multivibrator 37 whose constant output pulse width is approximately equal in time to the time between two successive horizontal synchronization pulses. This constant width pulse is variable from the leading edge of the original vertical synchronization pulse within a range of zero to eighteen thousand microseconds. The movable constant width pulse H occurs at the input to the coincidence mixer 38. This pulse is connected to one of the control grids of a mixer tube in the coincidence mixer. A signal containing the horizontal synchronization pulses RR is connected to the other control grid electrode of the mixer tube in the coincidence mixer 38. As the positive pulse from the variable width generator 35 can be varied over the length of one field of the television picture, it is possible to coincide the positive portion with any one of the horizontal synchronization pulses in that field, and thereby obtain a single gated horizontal synchronization pulse at the plate electrode of the tube of the coincidence mixer 38.

The signal I representing the selected or gated horizontal synchronization pulse is amplified by the inverter amplifier 39 to the form J and used to trigger the blocking oscillator 40 which generates a very narrow stable pulse K to trigger the phanastron delay generator 41. A potentiometer in the phanastron delay generator circuit varies the width of the precise measurement pulse. The trailing edge of this pulse is used to trigger blocking oscillator 42. This very narrow pulse is connected to the cathode on the monitor cathode ray display tube 10. The presence of this pulse is visible on the monitor as a movable dot superimposed on the object being measured. The dot is moved to the left side of the object being measured by the precise measurement control 23 and the precise measurement indicator 13 will provide a reading. The zeroing control 22 supplies a bucking voltage which returns the precise measurement indicator 13 to a zero reference reading. The precise measurement control 23 is then adjusted until the dot is moved to the right side of the object being measured. The reading obtained on the indicator 13 will then be an indication of the actual physical dimension.

The operation of the system when the movable contacts of the selector switch S1 engage their intermediate fixed contacts for comparison measurements according to Mode II is as follows:

A vertical synchronization signal from the camera control 2 is supplied by the conductor 3, as illustrated in FIG. 1, to the input terminal A of FIGS. 3 and 4. FIG. 2 shows the waveform present at A, and this waveform is differentiated by the differentiator circuit 30 to produce a pulse B which provides a positive leading edge pulse for triggering the grid electrode of the inverter amplifier 31. The resulting negative pulse C at the plate for triggering the grid electrode of the inverter amplifier of the output tube of the inverter amplifier 31 triggers bistable flip-flop tube 32. Thus, a half square wave cycle is produced by each vertical synchronization pulse from the inverter amplifier 31. This square wave D is differentiated in the differentiator 33 and then goes to the control grid of the inverter amplifier 34. A single positive pulse E resulting from two successive vertical synchronization pulses is then used to trigger a variable pulse width monostable multivibrator 35 and monostable multivibrator 43 whose pulse width is also variable. The function of the variable gate generator 35 will be considered initially. The gate length control 73 controls the length of the pulse required, permitting the operator to initially choose any horizontal line he desires when sampling the section of the standard.

The waveform F of the variable gate length pulse occurs at the input to differentiator 36. The circuit constants of the differentiator 36 differentiate the variable gate length waveform into two voltage peaks including a negative pulse and a positive pulse G which is variable in time with respect to the negative pulse. The positive pulse G triggers the monostable multivibrator 37 whose constant output pulse width is approximately equal in time to the time between two successive horizontal synchronization pulses. This constant width pulse is variable from the leading edge of the original vertical synchronization pulse within a range of from zero to eighteen thousand microseconds. The movable constant width pulse may be observed at H where it is applied to one of the control grids of the coincidence mixer 38. A signal containing the horizontal synchronization pulses is connected to RR which goes to the other control grid electrode of the coincidence mixer tube 38. As the positive pulse from the variable width generator 35 can be varied over the length of one field of the television picture, it is possible to produce coincidence of the positive portion with any one of the horizontal synchronization pulses in that field, and thereby obtain a single gated horizontal synchronization pulse at the plate electrode of the tube 38. This selected horizontal synchronization pulse I is amplified in the inverter amplifier 39 and goes to the video mixer 63 whose output triggers the monostable multivibrator 64. The output of this multivibrator 64 goes to the cathode of the cathode ray tube in the monitor 10 which indicates visually, as indicated by FIG. 6, which portion of the standard object is being used. The single video line, as shown in FIGS. 7 and 8, contains the desired information and includes the synchronization signal and blanking pulses at the beginning of the horizontal line. It is desirable to eliminate the synchronization signal and blanking pulse in order to obtain signals having waveforms comparable to those of FIGS. 9 and 10 of the drawings. In order to accomplish this result, the selected horizontal synchronization pulse pertaining to the standard object is differentiated in the differentiator 55 whose output AA triggers the delay gate generator 56 and its output pulse BB is differentiated in the differentiator 57.

The trailing edge of the pulse CC produced by the differentiator 57 triggers the fixed gate generator 58, producing a new gating signal DD with the beginning of the gate delayed by the width of the blanking pulse. The output of the fixed gate generator 58 is connected to one of the control grids of the coincidence mixer 59. The total composite video signal PP from the camera control 2 is connected to the other control grid of the coincidence mixer 59 whose output signal EE is a video pulse proportional to the width of the standard object. This negative signal is inverted in the amplifier 60 whose positive output pulse FF goes to the grid of the cathode follower 61 so that the signal at GG at the output of the cathode follower is of positive polarity having a pulse width indicative of the physical width of the standard object. The level of this signal may be adjusted by means of the amplitude adjustor 62. Such adjustment is desirable in order that the amplitudes of the standard object and unknown objects can be adjusted so as to be equal. Inasmuch as the duration of the signals representing the objects are indicative of the size of the objects, the amplitudes of these signals at this point are not significant.

The single positive pulse E resulting from two successive vertical synchronization pulses is used to trigger the variable gate generator 35, and is also used to trigger the variable gate generator 43. The gate length conger the variable gate generator 43. The gate length control 72 determines the length of the pulse required, permitting the operator to choose any horizontal line he desires when sampling the section of the unknown object. The waveform N of the variable gate length pulse occurs at the input to differentiator 44. The circuit constants of the differentiator 44 differentiate the variable gate length waveform into two voltage peaks including a negative pulse and a positive pulse which is variable in time with respect to the negative pulse. The positive pulse triggers the grid electrode of fixed gate generator 45 whose output pulse is of constant width and is approximately equal in time to the time between two successive synchronization pulses. This constant width pulse is variable from the leading edge of the original vertical synchronization pulse within a range of from zero to eighteen thousand microseconds. The movable constant width pulse may be observed at Q where it is applied to one of the control grids of the coincidence mixer tube 46. A signal RR containing the horizontal synchronization pulses emanating from the camera control 2 is applied to the other control grid electrode of the coincidence mixer tube 46. As the positive pulse from the variable width generator 43 can be varied over the length of one field of the television picture, it is possible to produce coincidence of the positive portion with any one of the horizontal synchronization pulses in that field, and thereby obtain a single gated horizontal pulse R at the plate electrode of the coincidence mixer tube 46. This selected horizontal synchronization pulse is amplified in the inverter amplifier 47 and goes to the video mixer 63 whose output HH triggers the monostable multivibrator 64. The output of this multivibrator 64 goes to the cathode of the cathode ray tube in the monitor 10 so as to indicate visually, as shown in FIG. 6 which portion of the unknown object 20 is being used. The single selected video line shown in FIGS. 7 and 8 contains the desired information and includes the synchronization signal and blanking pulse 27 at the beginning of the horizontal line. It is desirable to eliminate the synchronization signal and blanking pulse in order to obtain signals of waveforms comparable with those of FIGS. 9 and 10. In order to accomplish this result, the selected horizontal synchronization pulse pertaining to the unknown object is differentiated in the differentiator 48 whose output T triggers the delay gate generator 49 producing an output pulse U which is differentiated in the differentiator 50. The trailing edge of the resulting differentiated pulse V is of positive polarity and triggers the fixed gate generator 51, resulting in a new gating signal, with the beginning of the gate delayed by the width of the blanking pulse. The output W of the fixed gate generator 51 is applied to one of the control grids of the coincidence mixer 52. The total composite video signal PP from the camera control 2 is connected to the other control grid of the coincidence mixer 52 and the output signal X is a video pulse proportional to the width of the unknown object. This signal is amplified to produce an output signal Y which is applied to the grid of the cathode follower 54 whose output signal Z is of negative polarity with a pulse width indicative of the size of the physical width of the unknown object. The standard object output GG and the unknown object output Z are of equal amplitude and therefore the duration of the signals produced by the objects is indicative of their size, and the amplitudes of these signals are not significant.

The video signals GG and Z are connected to oppose one another and are clamped and integrated by the circuits which include the clampers 66 and 67, and the comparator-integrator 68. The resulting direct current signals, whose amplitudes are proportional to the dimensions of the standard and unknown objects, are algebraically added, the difference voltage signal KK being connected to the amplifier 12. The output signal goes to the comparator indicator 13 which indicates the difference in physical size between the standard and unknown object.

Finally, when the selector switch is in its third position, with the movable contact engaging the lowermost fixed contacts as viewed in FIG. 1, the difference signal KK is used to drive the servo motor 16. The amplitude and polarity of the signal KK will drive the servo motor in the proper direction to cause the machine tool or other appropriate processing equipment to modify the unknown object to conform it to the size or condition of the standard object, at which time the signal appearing across the servo motor input will become zero.

Whereas the invention has been described with respect to circuits selected for purposes of illustration, it will be evident to those skilled in the art that modifications encompassed by the appended claims are likewise contemplated.

I claim:

1. Inspection apparatus comprising a video camera for receiving light from a pair of objects to be compared and having an output circuit containing a signal proportional to a difference in dimensions of said objects, means for selecting from said camera output circuit line signals representing straight lines along said objects, display means in circuit with said selecting means visually presenting said line signals, comparison means for providing an indication of the difference of physical dimensions of said objects along said lines, and means for connecting said comparison means in circuit with said selecting means.

2. Inspection apparatus according to claim 1 wherein said comparison means is a direct reading device indicating actual differences in dimensions.

3. Inspection apparatus according to claim 1 wherein said selecting means provides a D.C. output difference signal.

4. Inspection apparatus according to claim 1 including a servo motor to be controlled as a function of the difference of physical dimensions of said objects along said lines, and means for selectively applying a difference signal from said selecting means to said comparison means and servo motor.

5. Inspection apparatus comprising a video camera for receiving light from a pair of objects to be compared and having an output circuit containing a signal proportional to a difference in dimensions of said objects, means for selecting from said camera output circuit line signals representing straight lines along said objects, means for modifying one of said objects, means in circuit with said selecting means producing a signal proportional to the difference in dimensions of said objects along said lines, and means operating said modifying means as a function of said difference signal to reduce said difference signal.

6. Inspection apparatus according to claim 5 wherein said modifying means responds to said difference signal until said difference signal becomes zero.

7. Inspection apparatus according to claim 5 wherein said modifying means is controlled by a servo motor responsive to said difference signal.

8. Inspection apparatus comprising a video camera for receiving light from at least two objects to be compared and having an output circuit containing a signal proportional to a difference in dimensions of two of said objects, means for selecting from said camera output circuit line signals representing straight lines along said two objects, display means in circuit with said selecting means visually presenting said line signals, comparison means for providing an indication of the difference of physical dimensions of said objects along said lines, and means for connecting said comparison means in circuit with said selecting means.

9. Inspection apparatus comprising a video camera for receiving light from at least two objects to be compared and having an output circuit containing a signal proportional to a difference in dimensions of two of said objects, means for selecting from said camera output circuit line signals representing straight lines along said two objects, means for modifying one of said objects, means in circuit with said selecting means producing a signal proportional to the difference in dimensions of said objects along said lines, and means operating said modifying means as a function of said difference signal to reduce said difference signal.

References Cited by the Examiner

UNITED STATES PATENTS

| | | | |
|---|---|---|---|
| 2,674,915 | 4/1954 | Anderson | 178—6 |
| 3,178,510 | 4/1965 | Rosin et al. | 178—6 |
| 3,218,389 | 11/1965 | Reed | 178—6 |
| 3,243,509 | 3/1966 | Stut | 178—6 |

JOHN W. CALDWELL, *Acting Primary Examiner.*

R. L. RICHARDSON, *Assistant Examiner.*